United States Patent

Humphreys et al.

[11] 3,972,186
[45] Aug. 3, 1976

[54] SPEED OVERRIDE CONTROL FOR HYDRAULIC MOTORS

[75] Inventors: Rex T. Humphreys, Washington; Glenn J. Medina, Joliet, both of Ill.

[73] Assignee: Caterpillar Tractor Co., Peoria, Ill.

[22] Filed: Feb. 28, 1975

[21] Appl. No.: 554,255

[52] U.S. Cl. .................................. 60/425; 60/427; 91/492; 60/483
[51] Int. Cl.² ................... F16D 31/02; F16D 39/00
[58] Field of Search ............ 60/905, 425, 427, 483; 91/492

[56] References Cited
UNITED STATES PATENTS

| | | | |
|---|---|---|---|
| 2,749,709 | 6/1886 | Vestre | 60/425 |
| 3,473,442 | 10/1969 | Farmer | 60/494 |
| 3,593,621 | 7/1971 | Praddaude | 91/492 |
| 3,610,507 | 10/1971 | Kiwalle | 91/47 |
| 3,757,524 | 9/1973 | Poyner | 60/483 |
| 3,759,042 | 9/1973 | Shioda et al. | 60/905 |
| 3,768,263 | 10/1973 | Olson | 60/905 |
| 3,863,447 | 2/1975 | Foster | 91/492 |

*Primary Examiner*—William L. Freeh
*Attorney, Agent, or Firm*—Phillips, Moore, Weissenberger, Lempio & Strabala

[57] ABSTRACT

A hydraulic system including a source of pressurized fluid and a multi-speed motor with a directional control valve for selectively directing fluid to the motor for forward and reverse operation thereof and a speed control valve operative to control the flow of the fluid to the motor for selective control of the speed thereof is provided with an override control valve that is operative to override the speed control valve under heavy load conditions to shift the speed control valve to a low-speed high-torque position for low-speed high-torque operation of the hydraulic motor.

7 Claims, 1 Drawing Figure

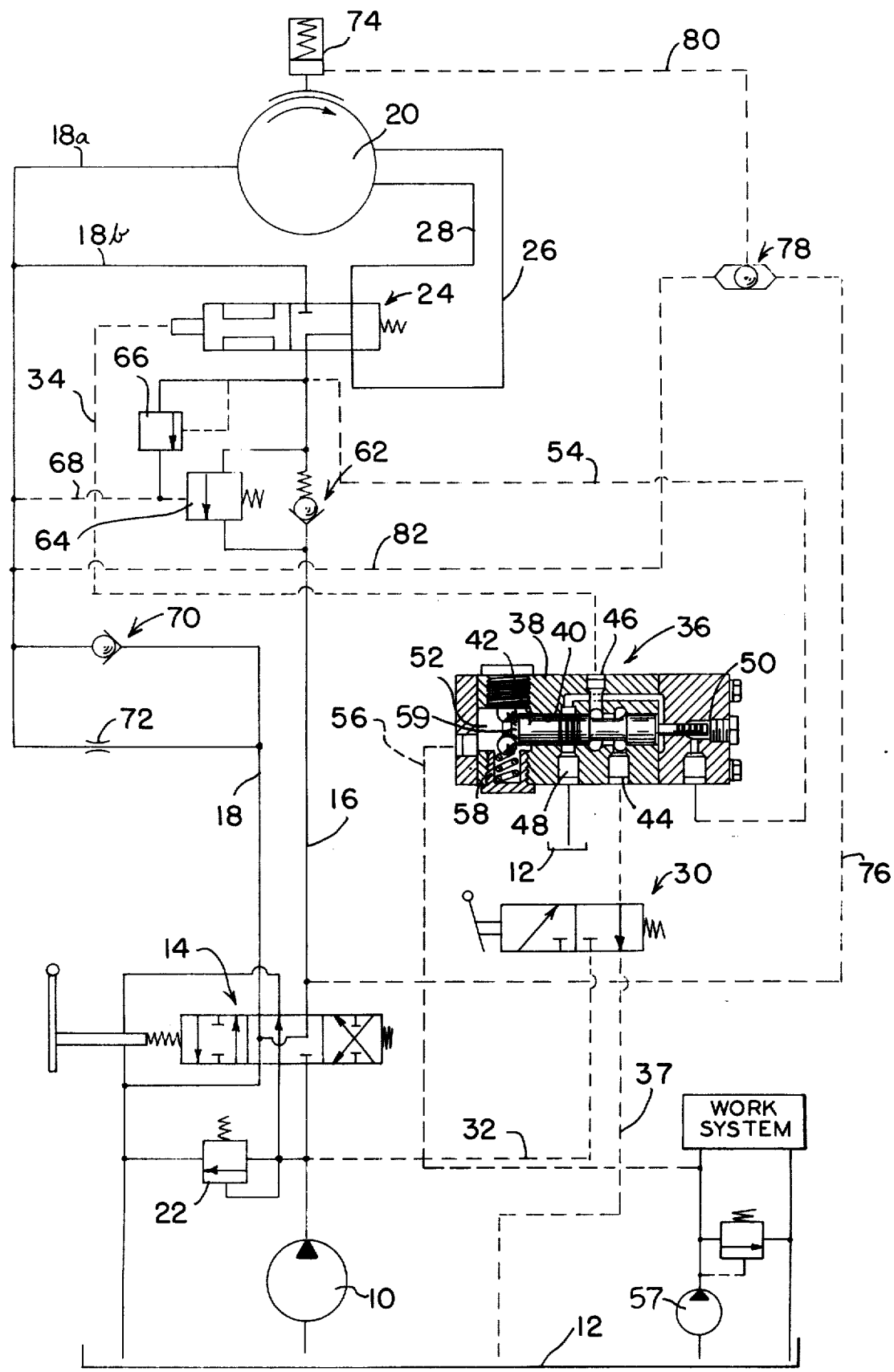

SPEED OVERRIDE CONTROL FOR HYDRAULIC MOTORS

BACKGROUND OF THE INVENTION

The present invention relates to hydraulic systems and pertains particularly to a system having a speed override valve which automatically causes the speed control valve of the system to shift to its low-speed position when the load on the hydraulic motor exceeds a predetermined value.

Some rotary output radial piston hydraulically driven motors are designed for multi-speed operation by selective direction of all fluid flow through a pair of inlet ports for high-torque low-speed operation or through only one of the inlet ports for low-torque high-speed operation. Such hydraulic motors are commonly employed in industrial and earth-moving installations such as winches and hoists or pipelayers and the like. One problem associated with hydraulic systems employing such motors is that excessive hydraulic pressure exceeding the rated pressure may be generated in the motor if the high-speed mode is engaged to raise a suspended load which is too heavy for the high-speed mode. Such excessive pressures may cause the fluid to leak past the pistons of the motor and could permit unexpected dropping of the suspended load. Such a situation could present a hazardous situation. Likewise excessive pressure may be generated if the proper speed mode is not selected for lowering such heavy loads.

One approach to multi-speed hydraulic motor drives is illustrated in the following U.S. patents: U.S. Pat No. 3,768,263 issued Oct. 30, 1973; U.S. Pat No. 3,610,507 issued Oct. 5, 1971; and U.S. Pat. No. 3,473,442 issued Oct. 21, 1969. These disclosures teach the use of a plurality of motors driven in parallel for low-speed high-torque operation and driven in series for high-speed low-torque operation.

However, none of these disclose a speed override control system that is operative to override the speed selected should the load be excessive for that speed.

SUMMARY AND OBJECTS OF THE INVENTION

The primary object of the present invention is to overcome the above-noted problems of the prior art.

Another object of the present invention is to provide a hydraulic control system for a multi-speed motor that includes load-responsive means for automatically reducing the motor to the low-speed high-torque operation for a predetermined load thereon.

A further object of the present invention is to provide a hydraulic control system for a dual-speed multi-piston hydraulic motor to include a speed override control valve that is operative to override the control valve to reduce the speed of the motor to the low-speed high-torque position under high load conditions.

In accordance with the primary aspect of the present invention, a hydraulic control system for a dual-speed multi-piston hydraulic motor is provided with a speed control valve for selecting high- or low-speed operation of the motor and a speed override control valve that is responsive to the load on the motor to automatically override the speed control valve to reduce the motor to the low-speed high-torque mode of operation under overload conditions.

BRIEF DESCRIPTION OF THE DRAWING

The above and other objects of the present invention will become apparent from the following description when read in conjunction with the accompanying drawing where the single FIGURE is a schematic layout of a hydraulic control system in accordance with the present invention.

DETAILED DESCRIPTION OF A PREFERRED EMBODIMENT

Referring now to the drawing, there is illustrated a schematic layout of a hydraulic control system including a suitable source of pressurized fluid such as a pump 10 drawing fluid from a reservoir 12 for supplying the fluid to a directional control valve 14 which in turn is operative to selectively direct the fluid by suitable conduit means including a first conduit 16 and a second conduit 18 for forward and reverse operation respectively of the rotary output radial piston hydraulic motor 20. A relief valve 22 is provided for relieving the system. Fluid communicated by way of the first conduit 16 is controlled by a speed control valve 24 which is operative to direct the fluid by way of conduits 26 and 28 to the motor 20. Each of the conduits 26 and 28 is adapted to direct pressurized fluid to one-half of the pistons in a predetermined sequence.

The speed control valve 24 is normally biased to its first position as shown to direct the fluid or communicate the fluid from conduit 16 through both conduits 26 and 28 to the motor 20 for low-speed high-torque operation thereof. In this mode of operation the fluid is sequentially directed to all of the pistons of the motor 20.

The valve 24 is pilot-operated to an extreme right position to communicate fluid from conduit 16 solely by conduit 26 to one-half of the pistons of the motor 20 in the predetermined sequence for high-speed operation thereof.

The speed control valve 24 is pilot-controlled by means of a speed selector valve 30 to which is communicated a pilot signal such as by way of conduit 32 from the output of pump 10. The speed selector valve 30 is a two-position valve and operative in a first position as shown to vent pilot control lines or conduit 34 which communicates with speed control valve 24 for pilot control thereof. The pilot control conduit 34 communicates by way of an override control valve 36 which is responsive to a predetermined pressure in conduit 16 communicated thereto by way of pilot conduit 54 to alter or block the pilot signal communicated by way of conduit 32 to conduit 34. A return line 37 communicates between speed selector valve 30 and tank 12 for communicating pilot line 34 with tank 12 when the valve 30 is in the position as shown. The selector valve 30 may be independently manually actuated as shown or may be automatically shifted to its leftward position by any suitable mechanical, electrical or hydraulic device in combination with shifting the control valve 14 to either of its extreme rightward or leftward positions.

The override control valve 36 comprises a housing 38 having a central cylindrical bore 40 in which is reciprocally mounted a valve spool 42. An inlet 44 and a pair of outlets 46 and 48 all communicate with central bore 40. The valve spool 42 is operative within the bore to control communication between inlet 44 and outlet 46 and outlet 48. The outlet 48 communicates with tank 12. The housing 38 includes chambers 50 and 52 at each end of the spool 42 for pilot control of the spool. Pilot conduit 54 communicates between conduit 16 and chamber 50 for communicating pressure thereto for biasing spool 42 to the left to provide communication between outlets 46 and 48. The pilot conduit 56 communicates between a pilot pump 57 and chamber 52 to bias the spool 42 to the right to provide communication between inlet 44 and outlet 46 when the fluid in the conduit 16 and thus chamber 50 decreases to a predetermined low level. Detent means 58, acting against an annular ramp 59 formed on the end of the valve spool 42, resists leftward movement of the valve spool and normally maintains the valve spool 42 in the rightward position as shown to provide communication between conduits or inlet 44 and outlet 46 until the pressure in conduit 16 reaches a predetermined high pressure level.

It should be noted that pilot pump 57 is independent of the main source 10 and is a source of pilot pressure that is substantially constant and not affected by system load. This prevents the speed override control valve 36 from varying as the load on motor 20 varies.

The conduit 16 includes check valve 62 for preventing return of fluid from the motor 20. However, this check valve 62 is bypassed by means of a pressure-responsive valve 64 which is responsive to a predetermined pressure within conduit 18 to shift the valve to its open position to bypass the valve 62. The damping valve 66 is connected to the conduit 16 between the check valve 62 and the speed control valve 24 to dampen pressure peaks which may be generated in the conduit when the motor brake for motor 20 is released. A conduit 68 communicates between the valve 66, bypass valve 64 and conduit 18.

The conduit 18 includes a check valve 70 for checking return flow of fluid from motor 20 and a bypass passage 72 with suitable restriction means to restrict the return flow of fluid from motor 20. This restriction maintains back pressure on the pistons during high speed forward operation to keep them seated against the cams. The check valve 70 permits essentially unrestricted flow of fluid by way of conduit 18 to the motor 20. Similarly, the check valve 62 permits substantially unrestricted flow of fluid by way of conduit 16 to the motor 20.

The motor 20 is provided with spring-applied pressure release brake 74. Brake 74 is pressure-released by means of fluid communicated thereto by means of conduit 76 communicating from conduit 16 by way of a shuttle valve 78 and conduit 80 to the brake 74. This arrangement permits automatic release of the brake 74 upon pressurization of the conduit 16 for driving of the motor in the forward direction.

Another conduit 82 communicates between the second conduit 18 by way of shuttle valve 78 and conduit 80 leading to the brake 74. This arrangement also communicates pressurized fluid from conduit 18 to release brake 74 when pressurized fluid is being supplied by way of conduit 18 or reverse operation of the motor 20.

The restricted bypass passage 72 is operative to maintain back pressure on the pistons during high-speed forward operation of the motor. This back pressure is necessary to maintain the pistons in normal contact with the cams of the motor to prevent flutter and the like that can cause damage to the pistons or the cam. The bypass valve 64 is operative to bypass the check valve 62 when motor control line 18 is pressurized to convey pilot fluid by way of line 68 to shift valve 64 for permitting return fluid from the motor 20 by way of conduit 16 to the sump 12.

OPERATION

For normal high-torque drive of the motor 20, speed control valve 24 is left in the position as shown for directing fluid by way of both motor lines 26 and 28 sequentially to all the pistons of the motor 20. Valves 30 and 36 are likewise left in the position as shown and valve 14 is shifted to the right to direct fluid from pump 10 by way of conduit 16 to valve 24 and thence to motor 20. This provides normal high-torque operation of the motor 20. Upon pressurization of line 16, pilot fluid is directed along conduit 76 past shuttle valve 78 by way of line 80 to release brake 74 and permit motor 20 to operate.

For high-speed forward operation of the motor 20 valve 24 is shifted to the right so that fluid directed along conduit 16 flows only along conduit 26 with conduit 28 being communicated with conduit 18b for return of fluid from the motor to the return tank. Speed selector valve 30 is likewise shifted to the right with valve 36 maintained in its position as illustrated to communicate pilot fluid by way of conduit 32, valve 30 through valve 36, conduit 34 to valve 24 to shift it to the right. Valve 14 is then shifted to the right to direct fluid from pump 10 by way of conduit 16, valve 24, line 26 to motor 20 for high-speed operation of motor 20.

It will be seen that fluid directed only by way of conduit 26 to the motor 20 will reach only one-half the pistons of the motor 20, thus resulting in high-speed operation of the motor 20. Should the motor 20 encounter an excessively high torque load, pressure buildup in conduit 16 is communicated by way of pilot conduit 54 to chamber 50 of the override control valve 36 for acting on valve spool 42 and shifting the spool to the left against the bias of the detent means 58, cutting off communication between inlet 44 and outlet 46 of valve 36 and at the same time establishing communication between outlet 46 and return outlet 48. With spool 42 in the leftward position fluid from valve 24 by way of line 34 is vented by way of outlet 48 to sump to permit the valve 24 to shift back to the left to the illustrated position thereby directing fluid from conduit 16 by way of both conduits 26 and 28 to motor 20 for low-speed high-torque operation thereof.

Once the valve spool 42 is in its leftward position, the force of the detent means 58 is exerted against the outer surface of the valve spool and the detent means do not exert an axial force thereon. Thus when the motor 20 is stopped under the preceding conditions, sufficient residual pressure will normally remain in conduit 16 and chamber 50 to retain valve 24 in its leftwardly shifted position during additional forward or any subsequent reverse operation of the motor.

Normal reverse operation of the motor 20 is accomplished by shifting valve 14 to the left for directing fluid from pump 10 by way of conduit 18 and line 18a to motor 20. When the line 18 is pressurized, pilot fluid is communicated by way of pilot line 82, shuttle valve 78 and pilot line 82 to brake 74 for releasing the brake and permitting motor 20 to operate. At the same time pressurized pilot fluid from line 18 is communicated by way of pilot line 68 to shift valve 64 to permit return fluid to flow from conduits 26 and 28 by way of valve 64 and conduit 16 to the return tank 12.

For low-torque reverse operation of the motor 20, the speed mode or position of the valve 24 is directly responsive to the position of the selector valve. However, should an attempt be made to operate the motor 20 in reverse when an excessively high-torque load tending to rotate the motor in the reverse direction is being exerted thereon, the fluid pressure generated in the conduit 16 will automatically shift the valve spool 42 to the left causing the valve spool 24 to be shifted to the left regardless of the position of the selector valve 30. When the valve 24 is in its leftward position all of the pistons in communication with the conduits 26 and 28 are effective in resisting the reverse torque load imposed on the motor. This minimizes pressure build-up in the motor and conduit 16 above the check valve 62.

It is seen from the above description that the override control valve 36 is operative to automatically override the high-speed selector valve 30 and speed-control valve 24 under excess load conditions to shift the valve 36 and valve 24 back to a low-speed high-torque condition.

While the present invention has been illustrated and described by means of a single embodiment, it is to be understood that the invention is to be limited only by the scope of the appended claims.

What is claimed is:

1. A hydraulic control system including speed override control means for rotary output radial piston hydraulic motors, comprising:
   a primary source of pressurized fluid;
   means including a directional control valve and conduit means for selectively directing fluid from said source to a reversible multi-speed hydraulic motor;
   a pilot operated speed-control valve operative to selectively control the flow of fluid in said conduit means to thereby selectively control the speed of said motor wherein said speed-control valve is a two-position valve operative in a first position to direct pressure fluid sequentially to all of said pistons for low-speed high-torque operation, and operative in a second position to direct pressure fluid to one-half of said pistons for high-speed operation; and
   an override control valve responsive to fluid pressure in said conduit means to alter said pilot signal to override said speed-control valve;
   a speed selector valve is operative to selectively control said speed-control valve by means of a pilot signal;
   said conduit means includes a first conduit for directing said fluid to one side of said motor for operation of said motor in one direction and a second conduit for directing said fluid to the other side of said motor for reverse operation thereof; and
   each of said first and second conduits includes a branch conduit controlled by said speed-control valve for controlling the speed of said motor.

2. The hydraulic control system of claim 1, wherein said override control valve is responsive to a predetermined pressure in said first conduit for interrupting said pilot signal so that said speed-control valve returns to said first position for high-torque low-speed operation.

3. The hydraulic control system of claim 2, wherein each of said first and second conduits includes a check valve to check return of fluid from said motor; and
   a restricted passageway for bypassing one of said check valves, and a pressure-responsive valve for bypassing the other of said check valves.

4. The hydraulic control system of claim 3, wherein said pressure-responsive valve bypasses the check valve in said first conduit, and said restricted passageway bypasses the check valve in said second conduit.

5. The hydraulic control system of claim 2 wherein:
   said override control valve is a two-position valve operative in a first position to provide communication between said speed-selector valve and said speed-control valve, and operative in a second position to block said communication and vent said speed-control valve to sump.

6. The hydraulic control system of claim 5 wherein said override control valve is a spool member reciprocally mounted in a bore in a housing for controlling said communication and said vent; and said spool is biased to said first position by pilot fluid pressure from a source independent of said primary source; and
   said spool is biased to said second position by fluid pressure from said primary source.

7. The hydraulic system of claim 6 including detent means for resisting movement of said spool from said first position to said second position.

* * * * *